(12) United States Patent
Gootter et al.

(10) Patent No.: US 6,193,309 B1
(45) Date of Patent: *Feb. 27, 2001

(54) BICYCLE SEAT

(76) Inventors: Steven M. Gootter, 7720B, El Camino Real, Box #282, Carlsbad, CA (US) 92009; Thomas D. Williams, 1211 1/2 Beryl St., San Diego, CA (US) 92109

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,271

(22) Filed: Mar. 12, 1999

(51) Int. Cl.$^7$ .................................................. B62J 1/00
(52) U.S. Cl. ...................................... 297/202; 297/452.22
(58) Field of Search ................................... 297/202, 261, 297/452.22, 452.21

(56) References Cited

U.S. PATENT DOCUMENTS

| 568,626 | * | 9/1896 | Pierce et al. ........................ 297/202 |
| 612,972 | * | 10/1898 | Leech ............................... 297/202 X |
| 1,538,542 | * | 5/1925 | Blake ................................... 297/202 |
| 4,898,422 | * | 2/1990 | West, III ............................. 297/202 |
| 5,823,618 | * | 10/1998 | Fox et al. ............................ 297/202 |
| 5,873,626 | * | 2/1999 | Katz ................................... 297/202 |

FOREIGN PATENT DOCUMENTS

13566 * 6/1897 (GB) ............................. 297/202 X

* cited by examiner

*Primary Examiner*—Anthony D. Barfield
(74) *Attorney, Agent, or Firm*—Bernard L. Kleinke; Foley & Lardner

(57) ABSTRACT

A bicycle seat for supporting the buttocks of a bicycle rider when the rider shifts his position on the seat between three positions, a touring position, a performance position, and a racing position. The seat eliminates pressure on the perineum and is designed for both men and women.

13 Claims, 7 Drawing Sheets

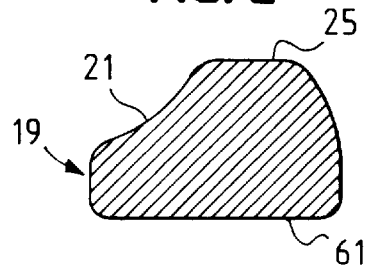
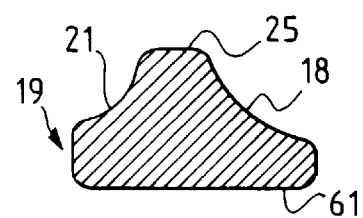
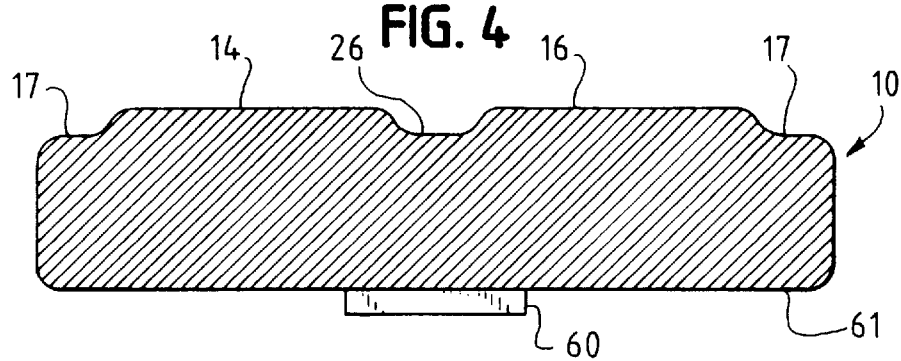
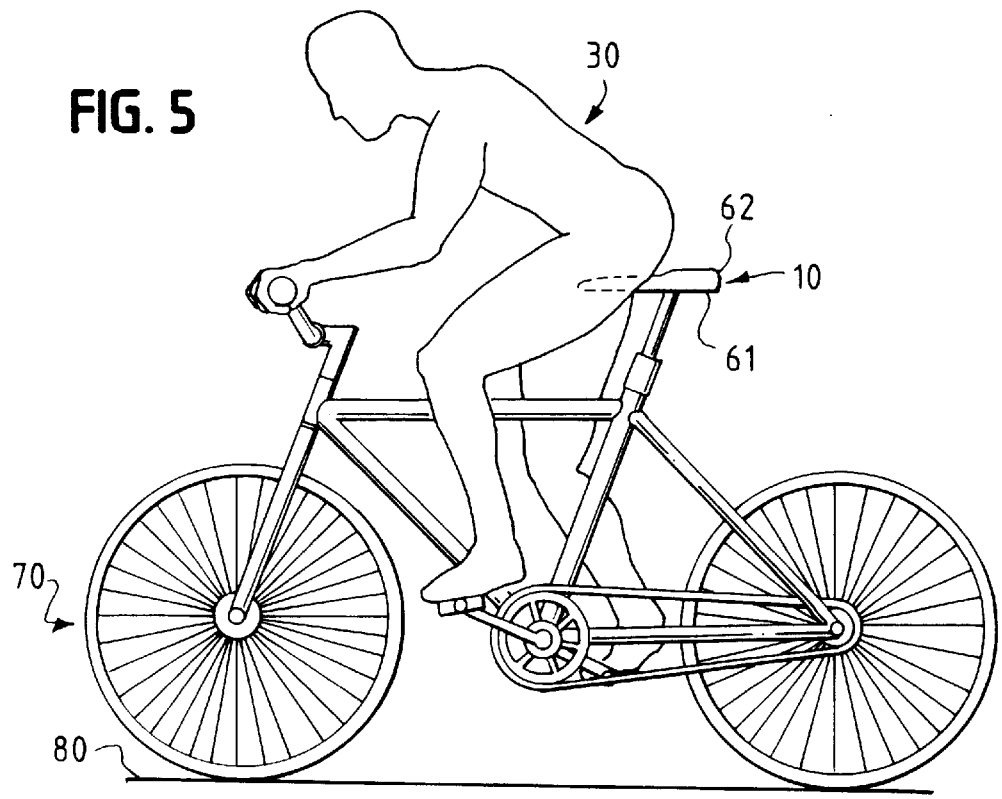

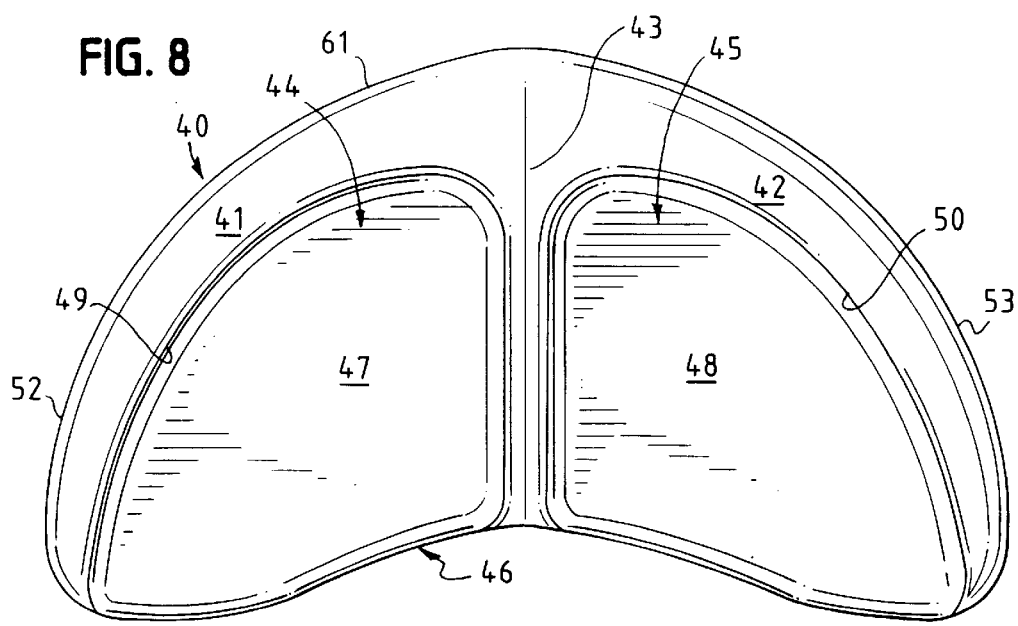
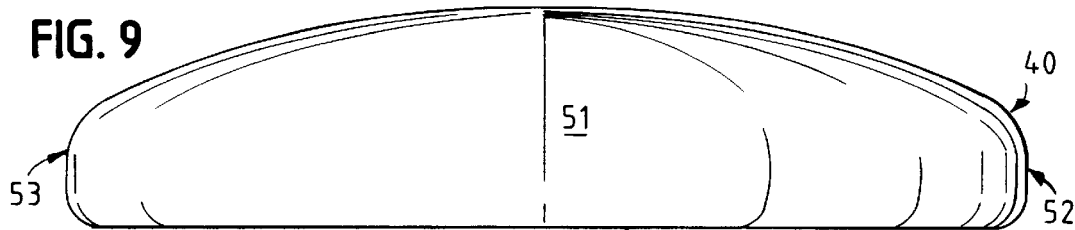
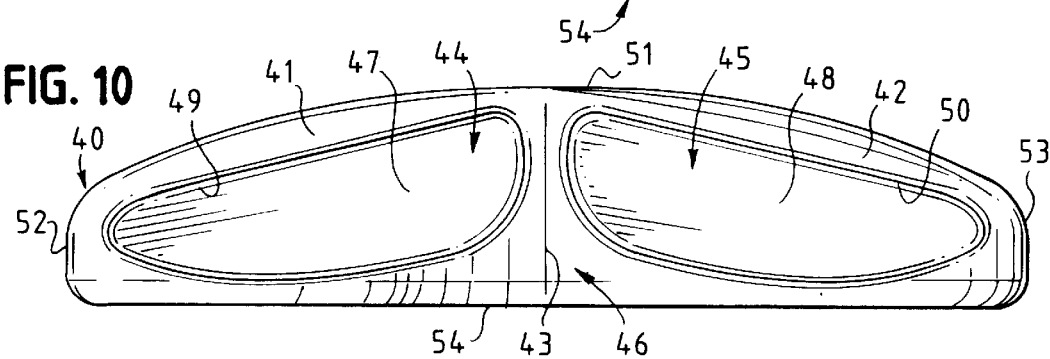
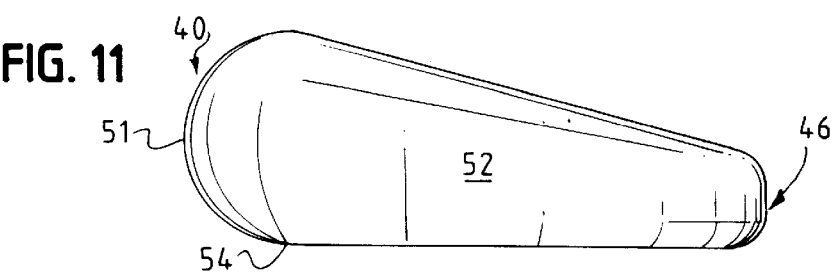

BICYCLE SEAT

This invention relates to a bicycle seat.

More particularly, the invention relates to a bicycle seat which comfortably supports a bicycle rider without creating pressure on the perineum when the rider is in any of several different positions on the bicycle seat.

In a further respect, the invention relates to a bicycle seat which comfortably supports a bicycle rider when he is in an upright seated touring position with his weight shifted to the rear, when he is in a performance position with his weight shifted forward on the medial portion of the seat, and when he is in an extreme forward position on the seat during a sprint.

In another respect, the invention relates to a bicycle seat which is specifically shaped and dimensioned to enable a rider to assume several different riding positions in which the seat supports the rider without creating pressure on the rider's perineum.

A wide variety of bicycle seats are known in the art. There does not, however, appear to be a bicycle seat which is adapted to allow a rider to assume several different positions in which the seat supports the rider without creating pressure on the rider's perineum.

Accordingly, it would be highly desirable to provide an improved bicycle seat which would facilitate a bicycle rider's assuming several differing positions on the seat while avoiding the creation of undesirable pressure on the rider's perineum.

Therefore, it is a primary object of the invention to provide an improved bicycle seat.

Another object of the invention is to provide an improved bicycle seat which permits a bicycle rider to sit in several different positions on the seat.

A further object of the invention is to provide an improved bicycle seat which does not generate significant pressure on the perineum in any of the positions which a bicycle rider can assume on the seat.

These and other, further and more specific objects and advantages of the invention will be apparent to those skilled in the art from the following detailed description thereof, taken in conjunction with the drawings, in which:

FIG. 2 is a cross section view of one of the arms of the seat of FIG. 1 taken along section line 2—2 thereof and further illustrating the contour of the top surface of the arm;

FIG. 3 is a another cross section view of one of the arms of the seat of FIG. 1 taken along section line 3—3 thereof and further illustrating the contour of the top surface of the arm;

FIG. 4 is a cross section view of the seat of FIG. 1 taken along section line 4—4 thereof and further illustrating the contour of the top surface of the seat;

FIG. 5 is a side elevation view illustrating the position of a rider on the seat of FIG. 1 while in the conventional racing position;

FIG. 8 is a top view illustrating another bicycle seat constructed in accordance with the invention;

FIG. 9 is a rear view further illustrating the seat of FIG. 8;

FIG. 10 is a front view further illustrating construction details of the seat of FIG. 8;

FIG. 11 is a side view illustrating the seat of FIG. 8,

Figure 1:
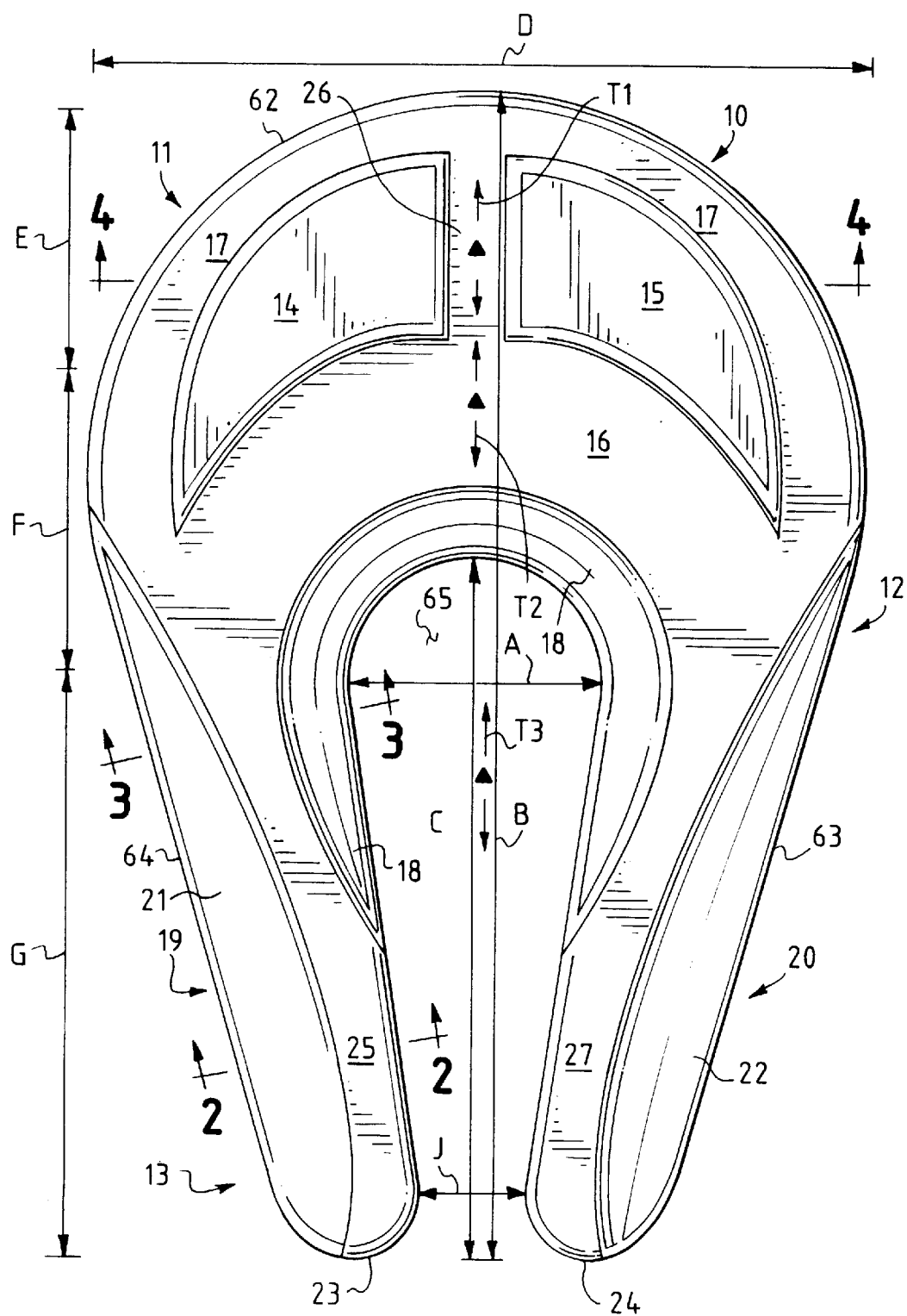
FIG. 1 is a top view illustrating a bicycle seat constructed in accordance with the principles of the invention.

Briefly, in accordance with our invention, we provide an improved bicycle seat. The bicycle seat includes a support platform. The support platform includes a front portion, a medial portion, and a rear portion. The front portion includes a spaced apart pair of converging arms for supporting a bicycle rider when the rider is in the racing position and the rider's tail bone is positioned over the front portion. Each of the arms includes a feathered canted side surface to contour to and minimize frictional engagement of the front portion with the inner surface of the thighs of a bicycle rider when the rider pedals the bicycle. The medial portion includes a recessed area and supports a rider's buttocks when the rider is in the performance position and the rider's tail bone is positioned over the medial portion. The recessed area is shaped and dimensioned to avoid producing pressure on the rider's perineum when the rider is seated on said platform. The rear portion supports the rider's buttocks when the rider is in the touring position and the rider's tail bone is positioned over the rear portion.

In another embodiment of the invention, we provide an improved method for traversing ground on a bicycle while in the touring, performance, and racing positions. The method includes the step of providing a bicycle seat. The bicycle seat includes a support platform. The support platform includes a front portion, a medial portion, and a rear portion. The front portion includes a spaced apart pair of converging arms for supporting a bicycle rider when the rider is in the racing position and the rider's tail bone is positioned over the front portion. Each of the arms includes a feathered canted side surface to contour and minimize frictional engagement of the front portion with the inner surface of the thighs of a bicycle rider when the rider pedals the bicycle. The medial portion includes a recessed area and supports a rider's buttocks when the rider is in the performance position and the rider's tail bone is positioned over the medial portion. The recessed area is shaped and dimensioned to avoid producing pressure on the rider's perineum when the rider is seated on said platform. The rear portion supports the rider's buttocks when the rider is in the touring position and the rider's tail bone is positioned over the rear portion. The method also includes the steps of mounting the seat on a bicycle; sitting on the rear portion of the seat while in the touring position; moving forwardly from the touring position to the performance position to sit on the medial portion of the seat; and, moving forwardly from the performance position to the racing position to sit on the front portion of the seat.

In a further embodiment of the invention, I provide an improved bicycle seat. The seat includes a support platform including a front portion, a medial portion, and a rear portion. The front portion includes a spaced apart pair of converging arms for supporting a bicycle rider when the rider is in the racing position and the rider's tail bone is positioned over the front portion. Each of the arms includes a distal end spaced apart from the distal end of the other arm and resiliently inwardly displaceable independently of the distal end of the other arm. The medial portion includes a recessed area and supports a rider's buttocks when the rider is in the performance position and the rider's tail bone is positioned over the medial portion. The recessed area is shaped and dimensioned to avoid producing pressure on the rider's perineum when the rider is seated on the platform. The rear portion supports a bicycle rider's buttocks when the rider is in the touring position and the rider's tail bone is positioned over the rear portion.

Turning now to the drawings, which depict the presently preferred embodiments of the invention for purposes of illustrating the invention and not by way of limitation of the scope of the invention, FIGS. 1 to 4 illustrate a bicycle seat constructed in accordance with the invention and generally indicated by reference character 10. Seat 10 includes a front portion 13, a medial portion 12, and a rear portion 11.

Rear portion 11 includes raised areas or plateaus 14 and 15 bounded by generally planar surface areas 16 and 17. Surface area 26 extends between plateaus 14 and 15. Plateaus 14 and 15 can comprise soft pliable packets of gelatin, can comprises soft resilient foam material, or can comprise any other desired material(s). Rear portion 11 also includes the back or end arcuate surface 62 of seat 10. The distance over which the rear portion of seat 10 extends is generally indicated by arrows E. The back of seat 10 is indicated by reference character 62.

Medial portion 12 includes the C-shaped, arcuate, recessed surface area 18. Area 18 partially circumscribes a part of the open area which extends through seat 10 intermediate arms 19 and 20. The medial portion 12 also includes a portion of arms 19 and 20 and of each of the feathered canted arcuate surface areas 21 and 22 on arms 19 and 20, respectively. As will be described, however, the primary usefulness and function of surface areas 21 and 22 normally occurs when a bicycle rider is utilizing the front portion 13 of seat 10. The distance over which the medial portion of seat 10 extends is generally indicated by arrows F.

Front portion 13 includes arms 19 and 20 and the majority of surface areas 21 and 22. Arms 19 and 20 include distal ends 23 and 24. Surface areas 21 and 22 need not be arcuate, can be flat, or can take on any desired shape and dimension as long as the function to minimize the contact of arms 19 and 20 with the inside of the thighs of a bicycle rider using portion 13. The distance over which the front portion of seat 10 extends is generally indicated by arrows G. The shape and dimension and proportional relationship between portions 11, 12, 13 can vary as desired. FIG. 1 accurately represents the presently preferred proportional relationship between portions 11, 12, 13. Arm 19 includes upper generally planar surface 25. Arm 20 includes upper generally planar surface area 27. Arms 19 and 20 are substantially rigid. However, arm 20 can be resiliently inwardly displaced in the direction of arrow N independently of arm 19. Arm 19 can be resiliently inwardly displaced in the direction of arrow M independently of arm 20. The distal ends 23 and 24 of arms 19 and 20 are not interconnected. Ends 23 and 24 can be inwardly resiliently displaced a distance in the range of about one-sixteenth to three-sixteenths of an inch. The resilient displacement of arms 19 and 20 is important in the practice of the invention because if a rider's left leg is, for example, displaced inwardly in the direction of N against arm 20 while the rider is pedaling vigorously in the performance or racing position, then the weight of the left leg bearing against arm 20 displaces arm 20 in the direction of arrow N to minimize the interference of arm 20 with the up and down movement of the rider's leg.

Presently, the length (indicated by arrows B) of seat 10 is in the range of about 8.00 to 16.00 inches, preferably 9.75 to 12.0 inches; the width (indicated by arrows D) of seat is in the range of about 5.00 to 7.50 inches; the distance indicated by arrows A is in the range of about one to two inches; the distance indicated by arrows C is about 5.00 to 6.50 inches; and the distance indicated by arrows J is in the range of about 0.25 to 1.00 inch. The shape and dimension of seat 10 can vary as desired; however, the general shape illustrated in FIG. 1 is presently preferred, as is the taper which is visible in FIG. 1 and occurs from the rear to the front portion of seat 10. The opening which passes completely through seat 10 intermediate arms 19 and 20 is important because it, along with recessed surface 18, functions to minimize or eliminate pressure on the rider's perineum. In addition, in order for seat 10 to function to support an adult rider in the touring, performance, and racing positions, it is believed impractical to reduce the length (indicated by arrows B in FIG. 1) much below ten inches. The length of the seat may be increased as desired, but ten inches is, for most adults, the shortest practical length of seat 10.

FIG. 2 illustrates a cross section of arm 19 along section line 2—2 in FIG. 1. Arcuate downwardly canting surface area 21 can, if desired, be flat or convex instead of having the concave curvature shown in FIG. 2.

FIG. 3 illustrates a cross section of arm 19 taken along section line 3—3 in FIG. 1. Arcuate downwardly canted surface area 18 can, if desired, be flat or convex instead of having the concave curvature shown in FIG. 3. The shape and dimension of arm 20 is identical to that of arm 19. Arms 19 and 20 are generally symmetrical with respect to the longitudinal axis of seat 10. The longitudinal axis of seat 10 is coincident with arrows C.

FIG. 4 illustrates a cross section of seat 10 taken along section line 4—4 in FIG. 1. Plateaus 14 and 15 can be seen extending upwardly from generally planar surface area 17. Seat 10 need not, if desired, include plateaus 14, 15 and rear portion 11 can instead have a generally flat upper surface.

The utilization of seat 10 to facilitate the movement of a rider 30 between several different positions on a bicycle 70 is explained with reference to FIGS. 5 to 7.

Figure 6:
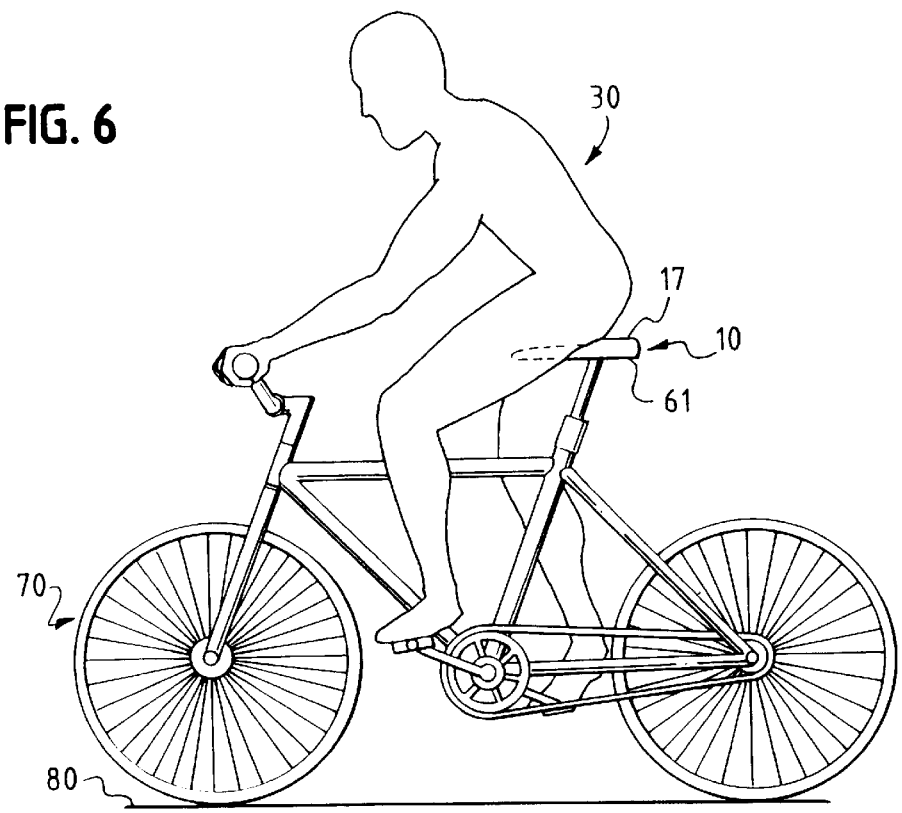
FIG. 6 is a side elevation view illustrating the position of a rider on the seat of FIG. 1 while in the conventional performance position.

In FIG. 6, rider 30 is seated on bicycle 70 in a conventional performance position with the tail bone of the rider 30 positioned over the medial portion 12 of seat 10. The rider's tail bone is accordingly normally positioned and centered above one of the points which lies directly above line T2. The rider's ischial tuberosities are normally positioned above and pressed against the medial portion of the seat. The triangle in line T2 indicates the point along line T2 above which the tail bone can be centered. When rider 30 is in the medial position, the taper of arms 19 and 20 facilitates free movement of the upper legs of rider 30 such that the rider's inner thighs do not unduly frictionally rub against the sides 63, 64 of seat 10. Arcuate recessed surface area 18 minimizes or eliminates pressure on the rider's perineum, as does the open area 65 intermediate arms 19 and 20. In the performance position, more of the rider's weight is, in comparison to the touring position, supported by the upper inner thigh and upper back of the thigh on each leg on either side of the perineum. Also, in the performance position, approximately 65% to 75% of the rider's weight is supported by the rider's buttocks pressing against and supported by seat 10.

Figure 7:
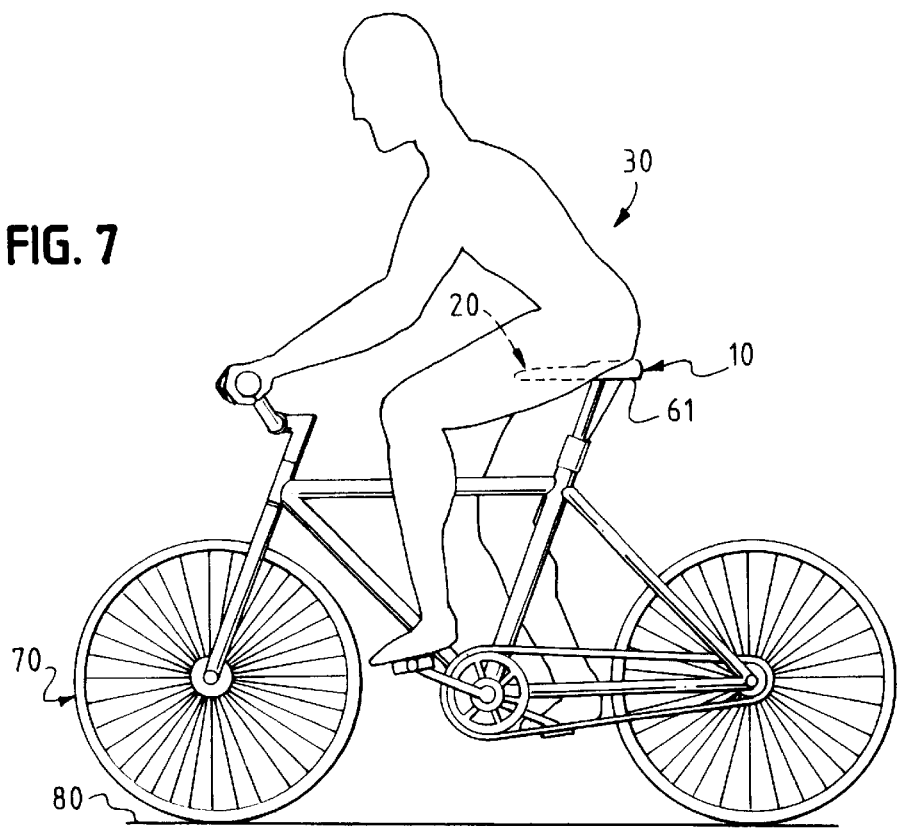
FIG. 7 is a side elevation view illustrating the position of a rider on the seat of FIG. 1 while in the conventional touring position.
Figure 12:
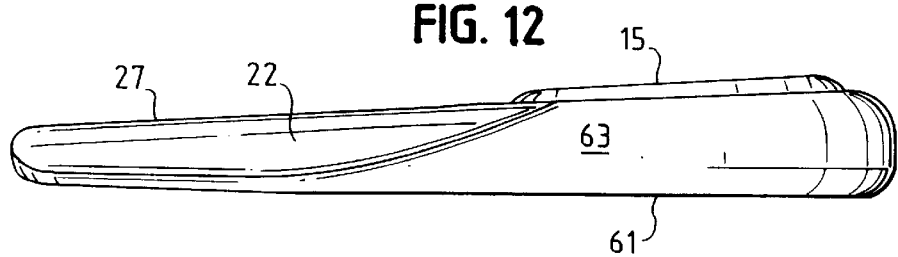
FIG. 12 is a side view illustrating the seat of FIG. 1.
Figure 13:
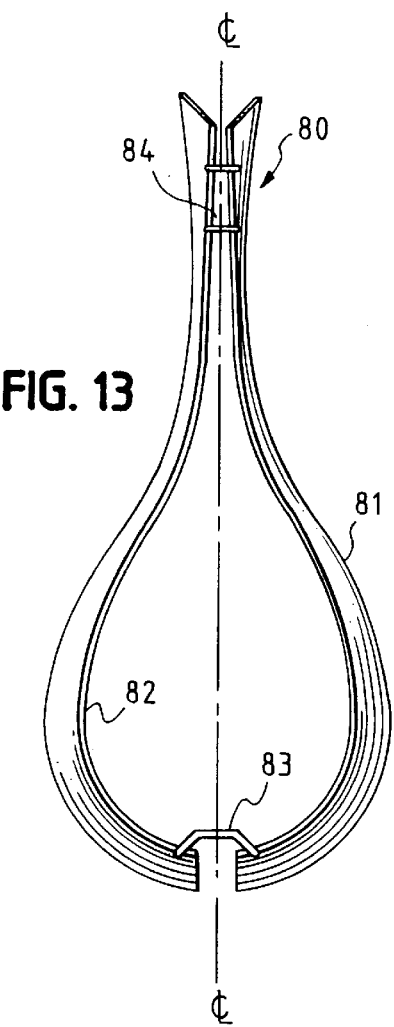
FIGS. 13 to 16 illustrate another embodiment of the invention.
Figure 14:
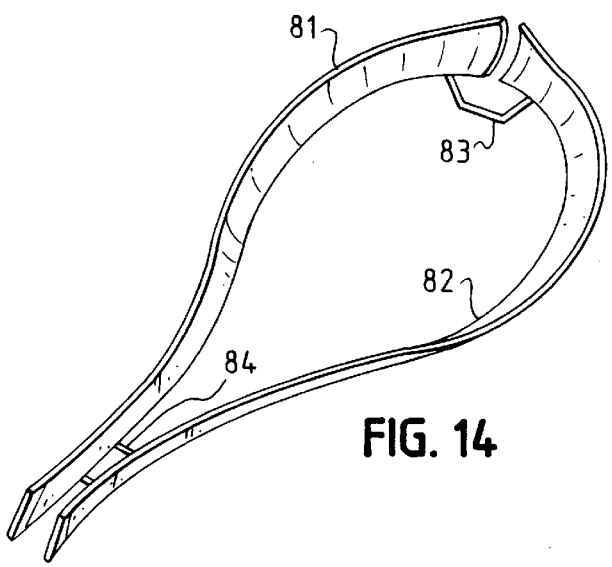
Figure 15:
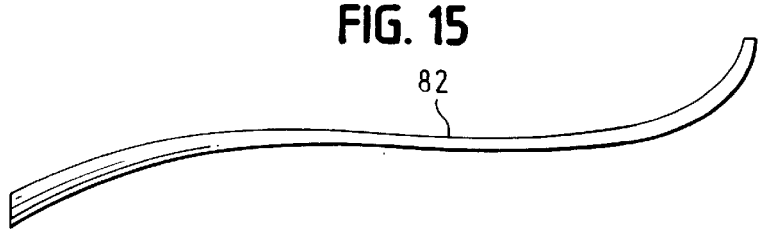
Figure 16:
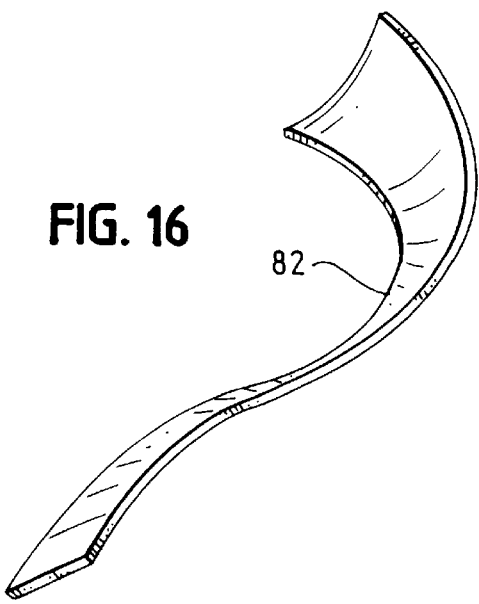

In FIG. 7, rider 30 is seated on bicycle 70 in a conventional touring position with his weight shifted on the rear portion of seat 10 such that his tail bone is positioned over the rear portion 11 of seat 10. The rider's tail bone is accordingly normally positioned and centered above one of the points directly above line T1. The rider's ischial tuberosities are positioned above and pressed against the rear portion 11 of seat 10. Approximately 70 to 80% of the weight of the rider bears down against the rider's buttocks and seat 10 when the rider is seated in the touring, position. The triangle in line T1 indicates one point along line T1 above which the tail bone can be centered. The buttocks of the rider rest at least in part on plateaus 14 and 15. Plateaus 14 and 15 and the rear to front taper of seat visible in FIG. 12 help provide clearance for the inner thighs of the rider 30 while the rider is pedaling, in the position illustrated in FIG. 7. The portion of opening 65 adjacent recessed surface 18, along with recessed surface 18, minimizes or eliminates pressured on the rider's perineum when the rider is in the position illustrated in FIG. 7.

In FIG. 5, the rider 30 is seated on bicycle 70 in a conventional racing position with the tail bone of the rider 30) positioned over the front or forward portion 13 of seat 10. Approximately 55% to 65% of the weight of the rider bears down against the rider's buttocks and seat 10 when the rider is seated in the racing position. The majority of the rider's tail bone is accordingly normally substantially positioned and centered above one of the points which lies directly above line T3. The triangle in line T3 indicates one point along line T3 above which the tailbone can be centered. Opening 65 minimizes or eliminates pressure on the rider's perineum when the rider 30 is in the position illustrated in FIG. 5. In addition, when the rider is in the position of FIG. 5 downwardly canted surface areas 22 and 21 facilitate free movement of the rider's legs during pedaling and facilitate minimization of frictional contact of the rider's inner thighs with the seat during pedaling over ground 80. When the rider moves forward on the bicycle from the touring position of FIG. 7 to the racing position of FIG. 5, the rider's upper thighs tend to be positioned adjacent the sides 63 and 64 of seat 10 near the distal ends 23 and 24 of arms 19 and 20. Since the upper thighs flare, and normally are wider than the lower thighs, additional space facilitates the free movement of the upper thighs. "Feathering" or shearing off a portion of a conventional bicycle seat 10 to produce the canted surfaces areas 21 and 22 found in the seat 10 of the invention functions to create an additional "open area" (i.e. an area not occupied by seat 10) though which the inner upper thighs can move without unduly frictionally contacting seat 10. The position of the rider's pelvis with respect to seat 10 when the rider is in the racing position of FIG. 5 differs from the relationship between the rider's pelvis and the seat when the rider is in the touring or performance positions illustrated in FIGS. 7 and 6, respectively. When the rider is in the racing position, the ischial tuberosities tend to be positioned laterally of surfaces 21 and 22 such that the lowermost portions of the ischial tuberosities straddle and tend to lock or engage surfaces 21 and 22 of arms 19 and 20 intermediate said lowermost portions of said tuberosities. Even though the ischial tuberosities of the pelvis tend to straddle arms 19 and 20 when a rider 30 is in the racing position, arms 19 and 20 are spaced sufficiently apart to prevent pressure from being applied to the rider's perineum by arms 19 and 20. Some minor amount of pressure may be applied to the peripheral portions of the perineum, but arms 19 and 20 are shaped and spaced such that any pressure applied to the perineum is much less than that encountered in a conventional bicycle seat.

An alternate embodiment of the invention is illustrated in FIGS. 8 to 11 and comprises a wedge shaped seat 40 having a back 51, bottom 54, sides 52 and 53, and front 46. Seat 40 tapers from back to front in the manner illustrated in FIG. 11. Recessed surface areas 47 and 48 are shaped to receive the buttocks of a rider. Ridge 43 extends intermediate surface areas 47 and 48. Generally planar surface area 41 extends between surface area 47 and back 51. Generally planar surface area 42 extends between surface area 48 and back 51. Surface area 47 includes a canted arcuate wall or side surface 49 which in FIG. 10 extends downwardly from surface area 41. Surface area 48 includes a canted arcuate wall or side surface 50 which in FIG. 10 extends downwardly from surface area 42. One important advantage of the seat 40 is that seat 40 does, since it does not include a pommel, not produce any pressure on the perineum.

FIGS. 13 to 16 illustrate an alternate embodiment of the invention comprising a "ribbon" bicycle seat including rigid arctuate members 81 and 82 fixedly connected by the braces 83 and 84.

The seat of FIG. 1 has a length (arrows B) to width (arrows D) ratio in the range of 2.00:1.0 to 1.4:1.00, preferably in the range of 1.75:1 to 1.5:1.00, most preferably 1.6:1.00 to 1.5:1.00. Further, the ratio of the width D at the rear of the seat to the width of arms 19 and 20 from the tip of arrow M to the tip of arrow N is in the range of about 4.20:1.0 to 3.25:1, preferably about 4.00:1.00 to 3.4:1. The length of seat 10 is at least about nine and three-quarters inches. This length is necessary for a seat to have rear, medial and front portions which can, for the large majority of adult riders, accommodate an adult rider's touring performance, and racing positions. While the seat 10 can, if desired, be longer than about nine and three-quarters inches, making seat 10 less than about nine and three-quarters inches inches long is presently not desirable.

When the seat 10 of FIG. 1 has a length B of ten inches, a width D of 6.50 inches, an opening 65 with a width A of 2.00 inches and a width J of 0.625 inch, and a width between arrow M and N of 1.75 inches, then seat can be used by and "fits" over 90% of the adult population. As would be appreciated by those of skill in the art, reducing the size of seat 10 for children and smaller sized adults and increasing the size of seat 10 for large adults is a straightforward readily accomplished matter. Extensive testing is not required. The criteria used to make larger or smaller seats are those discussed above in defining the rear, medial, and front portions of seat 10 for the touring, performance, and racing positions of a rider.

Figure 17:
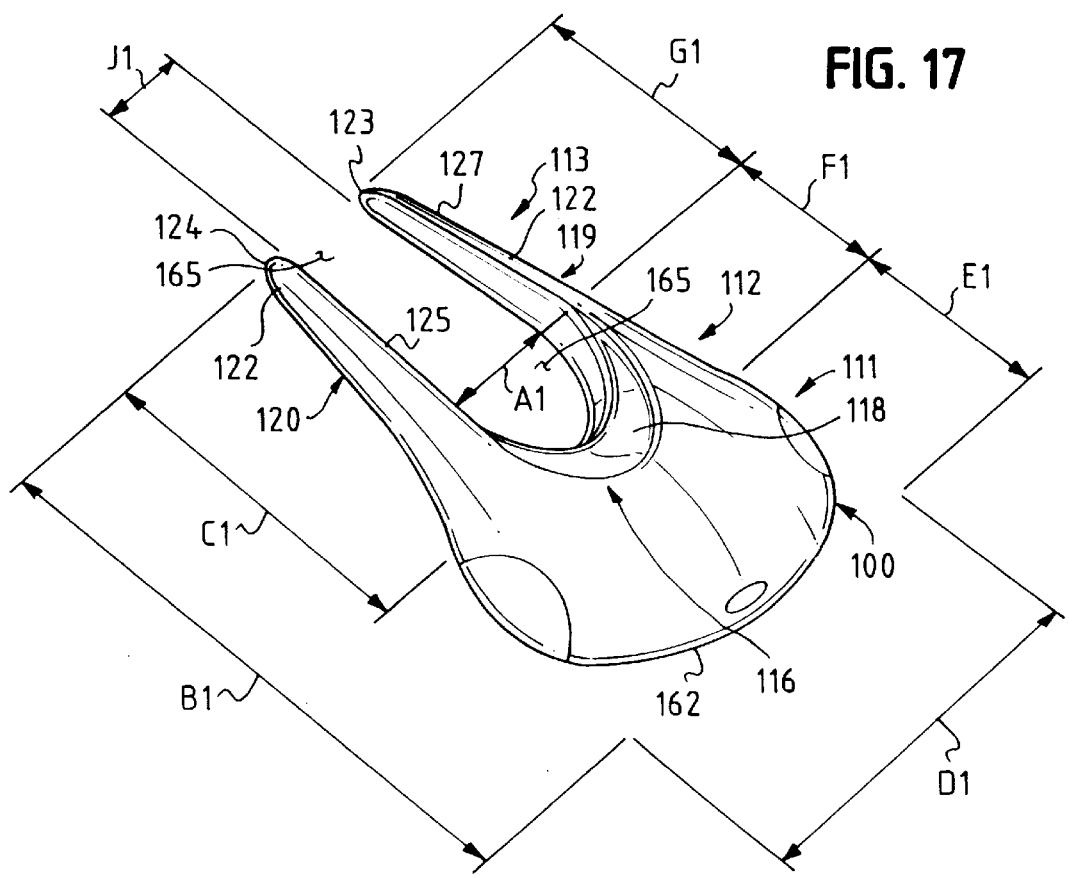
FIGS. 17 and 18 illustrate another embodiment of the invention.
Figure 18:
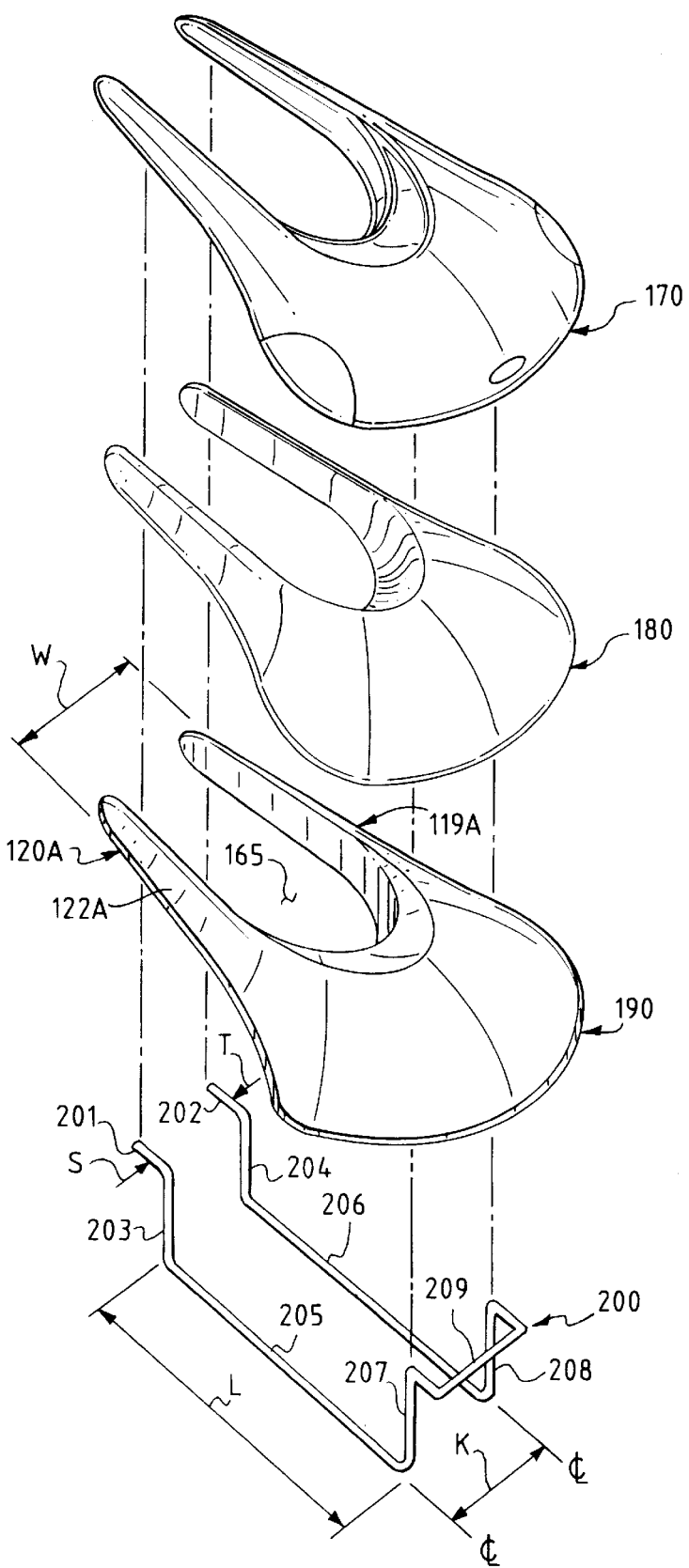

A further embodiment of the seat of the invention is depicted in FIGS. 17 and 18 and is generally similar to the seat illustrated in FIG. 1. In FIG. 17 seat 100 includes a rear portion 111 indicated by arrows E1, a medial portion 112 indicated by arrows F1, and a front portion 113 indicated by arrows G1. Rear portion 111 of seat 100 includes upper support surface 116 and back edge 162. Spaced apart arms 119 and 120 extend from medial portion 112. Arctuate concave surface 118 is formed in the upper portion of medial portion 112. Arm 120 includes end 124, elongate upper surface 125 and outer concave surface 122. Arm 119 includes end 123, elongate upper surface 127 and outer concave surface 122. The length B1 of seat 100 is presently preferably ten inches. The width D1 of rear portion 111 is six and one-half inches. The width A1 of the portion of opening 165 in medial portion 112 is two inches. The width J1 of the portion of opening 165 near ends 123 and 124 is 0.625 inch. The length C1 of opening 165 is six and one-half inches. The width W between the outsides of the ends of arms 119 and 120 is about one and three-quarters inches.

The shape and dimension and size of seat 100 will fit comfortably over 90% of the adult population. Seat 100 (and seat 10) can, if necessary for children or larger or smaller than usual adults, be readily reduced or increased while maintaining the proportional relationships of the seat. For example, the proportional relationship of the length B1 to the width D1 is about 1.5:1.0. The proportional relationship of the width A1 to the width J1 of opening 165 is about 3.2:1.0. These proportional relationships, as well as the other proportional relationships in seat 100, can be maintained when the size of the seat 100 is increased or decreased.

FIG. 18 illustrates one possible construction of seat 100 wherein seat 100 includes a plastic shell 190, a foam liner 180 shaped and dimensioned to contour and conform to the top of plastic shell 190, and a vinyl or leather cover 170 which covers and protects foam liner 180 after liner 180 is mounted on shell 190. Wire bracket 200 is shaped to fit in the bottom of shell 190 so that shell 190 can be mounted on a bicycle in conventional fashion. Shell 190 includes arms 119A and 120A. Arms 120A has concave side surface 122A. Opening 165A is formed between arms 119A and 120A. The shape and dimension of arms 119A, 120A, of surface 122A, and of opening 165A is generally equivalent to the shape and dimension of arms 119, 120, of surface 122, and of opening 165 in FIG. 17.

Bracket 200 includes elongate parallel spaced apart base wire segments 205 and 206. Legs 203, 204, 207, 208 each depend from and are normal to either base wire segment 205 or base wire segment 206. Foot 201 is normal to and outwardly depends from leg 203. Foot 202 is normal to and outwardly depends from leg 204. U-shaped member 209 interconnects and is attached to legs 207 and 208. The distance, indicated by arrows K, between feet 201 and 202, between legs 203 and 204, and between legs 207 and 208 is one and three-quarters inches. The length, indicated by arrows L, of each base wire segment is five inches. While bracket 200 is substantially rigid, inward compressive displacement forces, indicated by arrows S and T, generated against feet 201 and 202 or against legs 203 and 204 can inwardly resiliently displace feet 201 and 202 toward each other. The construction of bracket 200 is important in the practice of the invention because feet 201 and 202 are spaced apart and are not connected to one another. This permits each foot 201 and 202 to move independently of the other. This is important because foot 201 engages end 124 (or arm 120) and foot 202 engages end 123 (or arm 119) of seat 100. Ends 123 and 124 are similarly spaced apart and are not connected to each other and can move independently of one another. The ability of feet 201 and 202 to each be independently resiliently inwardly displaced toward and away from each other goes hand-in-hand with the ability of each end 124 and 123 of arms 120 and 119 to be independently resiliently inwardly displaced with respect to the other end 124, 123. Arms 119 and 120 are preferably substantially rigid, but can, as earlier noted, be inwardly resiliently displaced by lateral forces of the magnitude which commonly are generated by a rider's leg against arm 119 or 120, as the case may be, when a rider is in the racing position illustrated in FIG. 5, or, when the rider is off seat 100 and is "standing" on the pedals of the bike and pedaling with only the rider's inner upper thighs contacting arms 120 and 119. After a compressive force generated in the direction of arrow S or T against an arm 201 and 202 is released, then the arm 201, 202 (along with leg 203, 204 and segment 205, 206) and arm 119, 120 moves outwardly away from the opposing arm (or leg or segment) and returns to its normal operative position illustrated in FIG. 18. U-shaped member 209 generally prevents legs 207 and 208 from being displaced toward or away from one another.

Having described my invention in such terms as to enable those skilled in the art to understand and practice it, and having identified the presently preferred embodiments thereof,

What is claimed is:

1. A bicycle seat for a bicycle having an overall length (B) and a maximum width (D), comprising:
   (a) an elongated frontal portion including a frontal support surface for supporting a bicycle rider when the rider is in a racing position with his or her tail bone positioned over said frontal portion, and having means defining an elongated opening with inner surfaces converging toward the front of the seat and positioned to receive the neurovascular bundle in the perineal area of the rider when the rider is in a performance or racing position, said means defining an elongated opening including recessed sloping walls and at least a portion of said elongated opening being a through-hole passing entirely through the seat, said frontal portion having an overall length (G) substantially equal to one-half of the overall length (B) to enable the rider to control the bicycle in performance or racing position;
   (b) a perforate medial portion integrally connected to said frontal portion and including a medial support surface designed to support the rider when the rider is in a performance position and his or her tail bone is positioned over said medial portion, said medial support surface having means defining an arcuate opening extending coextensively and contiguously from said elongated opening and forming its rearmost terminus, said means defining an arcuate opening including a recessed arcuate sloping wall and at least a portion of said arcuate opening being a through-hole passing entirely through the seat, said arcuate opening being positioned, shaped, and dimensioned to avoid producing pressure on the rider's perineum when the rider is seated on the seat, the rearmost terminus of said arcuate opening being disposed in said medial portion at a distance from the front of the seat equal to about ⅝ of the overall length (B) to position said arcuate opening so that said arcuate opening receives the neurovascular bundle of the rider when the rider is in the touring position, and extending therefrom continuously forwardly to form said elongated opening in said frontal portion, to form a single continuous opening;
   (c) an imperforate rear portion integrally connected to said medial portion at about the maximal width (D) and extending rearwardly therefrom, said rear portion having a length equal to about one quarter of the overall length (B), said rear portion including a rear support surface for supporting the rider's buttocks when the rider is in a touring position with his or her tail bone positioned over said rear portion, said maximal width (D) being equal to about one-half of the overall length (B);
   (d) wherein said frontal support surface, said medial support surface, and said rear support surface are generally coplanar and are tapered gradually; and
   (e) said continuous opening being generally tear-drop shaped and being positioned such that a neurovascular bundle of the rider is positioned over and received by said continuous opening when a rider is in a touring, performance, or racing position, said continuous opening having a width (A) sufficient to receive the entire width of the neurovascular bundle of the rider within said continuous opening when the rider is in the touring, performance, or racing positions and when the seat is compressed under the weight of the rider, said continuous opening being positioned, shaped, and dimensioned consistent with anatomical measurements of the size and location of the neurovascular bundle.

2. A bicycle seat according to claim 1, wherein a width (J) is about two inches at the top surface of the seat.

3. A bicycle seat according to claim 1, wherein the ratio of the overall length (B) to the maximum width (D) is about 1.00 to 2.00.

4. A bicycle seat according to ca wherein the ratio of the overall length (B) to the maximum width (D) is about 1.40 to 2.00.

5. A bicycle seat according to claim 1, wherein the ratio of the overall length (B) to the maximum width (D) is about 1.5 to 2.00.

6. A bicycle seat according to claim 1, wherein the ratio of the length of the frontal portion to the overall length (B) is about 0.40 to 0 60.

7. A bicycle seat according to claim 1, wherein the ratio of the length of the frontal portion to the overall length B is about 0.5.

8. A bicycle seat according to claim 1, wherein the ratio of the length of the medial portion to the overall length (B) is about 0.18 to 0.32.

9. A bicycle seat according, to claim 1, wherein the ratio of the length of the medial portion to the overall length B is about 0.25.

10. A bicycle seat according to claim 1 wherein the frontal portion includes a pair of arms.

11. A bicycle seat according to claim 1, wherein the frontal portion includes a pair of arms. each one of said arms including a feathered canted side surface designed to minimize friction engagement of the frontal portion with the inner surface of the thighs of the rider when the rider is pedaling the bicycle.

12. A bicycle seat according to claim 1, wherein the rearmost portion of the opening is arcuate in shape.

13. A bicycle seat according to claim 1, wherein the rearmost portion of the opening has a semi-circular portion.

* * * * *